United States Patent
Hopkins et al.

(10) Patent No.: US 12,322,961 B2
(45) Date of Patent: Jun. 3, 2025

(54) PARALLEL CHANNEL VOLTAGE FEEDBACK

(71) Applicant: Hamilton Sundstrand Corporation, Charlotte, NC (US)

(72) Inventors: Christopher Hopkins, Ledbury (GB); John F. Defenbaugh, Rockford, IL (US); Michael C. Harke, De Forest, WI (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 273 days.

(21) Appl. No.: 18/318,222

(22) Filed: May 16, 2023

(65) Prior Publication Data

US 2024/0388084 A1    Nov. 21, 2024

(51) Int. Cl.
*H02J 1/10* (2006.01)
*G05F 1/573* (2006.01)
*H02H 9/02* (2006.01)
*H02J 1/12* (2006.01)

(52) U.S. Cl.
CPC .............. *H02J 1/10* (2013.01); *G05F 1/573* (2013.01); *H02H 9/02* (2013.01); *H02J 2310/44* (2020.01)

(58) Field of Classification Search
CPC ...... H02J 1/10; H02J 1/12; H02J 1/108; H02J 2310/44; G05F 1/573; H02H 9/02
See application file for complete search history.

(56) References Cited

U.S. PATENT DOCUMENTS

| | | | |
|---|---|---|---|
| 5,796,601 A * | 8/1998 | Yamamoto | H02M 7/17 363/69 |
| 7,050,278 B2 | 5/2006 | Poulsen | |
| 7,911,244 B2 | 3/2011 | Kikuchi et al. | |
| 10,830,810 B2 | 11/2020 | Winer et al. | |
| 2010/0164289 A1* | 7/2010 | Umminger | G05F 1/565 307/55 |
| 2022/0371744 A1 | 11/2022 | Harke et al. | |
| 2022/0376498 A1* | 11/2022 | Harke | H02J 1/106 |
| 2023/0065688 A1 | 3/2023 | Joyce et al. | |
| 2024/0359561 A1* | 10/2024 | Vovos | B60L 3/003 |

OTHER PUBLICATIONS

European Search Report for Application No. 24176429.9, mailed Nov. 5, 2024, 8 pages.

* cited by examiner

*Primary Examiner* — Rexford N Barnie
*Assistant Examiner* — Rasem Mourad
(74) *Attorney, Agent, or Firm* — CANTOR COLBURN LLP

(57) ABSTRACT

A power supply system includes first and second generators that are measured by first and second current sensors. The system also includes a first generator controller configured to: receive a first current signal from the first current sensing device and a second current signal from the second current sensing device; analyze the first current signal and the second current signal to determine a first voltage foldback value based on a first common mode current calculated from the first current signal and the second current signal; and operate the first DC power supply to reduce a first voltage output of the first DC power supply by the first voltage foldback value.

18 Claims, 4 Drawing Sheets

PARALLEL CHANNEL VOLTAGE FEEDBACK

BACKGROUND

The present invention generally relates to parallel direct current (DC) sources, and more specifically, to feedback used to control power sharing of paralleled sources.

Aircraft require electrical power to operate many parts of the aircraft system, including on-board flight control systems, lighting, air conditioning etc. The current and future generations of aircraft use more and more electrical control in place of conventional hydraulic, pneumatic etc. control. Such more electric aircraft (MEA) have advantages in terms of the size and weight of the controls and power systems as well as in terms of maintenance and reliability.

Most current large commercial aircraft use electricity, on-board, in the form of an AC fixed frequency and/or variable frequency network. Steps have been made to move from 115 V ac to 230 V ac and more recent developments have allowed power supplies to supply high voltage dc (HVDC) e.g. +/−270 V dc, providing improvements in terms of additional functionality, power supply simplification, weight savings and thus fuel efficiency.

Generally, voltage is provided on board an aircraft in one of two (or more) ways. When the aircraft is on the ground, power comes from an external ground generator supplying, say 115 V ac at 400 Hz. An auto-transformer rectifier unit (ATRU) rectifies the supply voltage to provide voltages required for the different loads on the aircraft. Instead of an ATRU, the power can be rectified by active rectification using power flow controllers.

When the aircraft is in the air the power comes from the aircraft engine or auxiliary power unit (APU) via a three-phase ac generator that could then be rectified. The rectified power is provided to a so-called DC bus.

BRIEF DESCRIPTION

Embodiments of the present invention are directed to a system for controlling aircraft power systems.

In one embodiment the system is directed to system that includes a first direct current (DC) power supply comprising a first generator and a first rectifier circuit and a second DC power supply comprising a second generator and a second rectifier, wherein a first output of the first DC power supply and a second output of the second DC power supply are commonly coupled at a common bus point. The system also includes: a first current sensing device coupled between the first output of the first DC power supply and the common bus point; a second current sensing device coupled between the second output of the second DC power supply and the common bus point; and a first generator controller. The first controller is configured to: receive a first current signal from the first current sensing device and a second current signal from the second current sensing device; analyze the first current signal and the second current signal to determine a first voltage foldback value based on a first common mode current calculated from the first current signal and the second current signal; and operate the first DC power supply to reduce a first voltage output of the first DC power supply by the first voltage foldback value.

In one example system, the first DC power supply can be in parallel with the second DC power supply.

In one example system, the first voltage foldback value can based off of a first common mode current portion ($i_{CM}$) of the first current signal. In an prior system, $i_{CM}=(i_1+i_2)*0.5$ wherein $i_1$ is the first current signal and $i_2$ is the second current signal.

In one example system, the system can further include a second generator controller configured to: receive the first current signal and the second current signal; analyze the first current signal and the second current signal to determine a second voltage foldback value based on a second common mode current calculated from the first current signal and the second current signal; and operate the second DC power supply to reduce a second voltage output of the second DC power supply by the second voltage foldback value.

In one example system, the second voltage foldback value is based off of a second common mode current portion ($i_{CM2}$) of the second current signal.

In one example system, $i_{CM2}=(i_1+i_2)*0.5$.

In one example system, determining the first voltage foldback value can include filtering, by an electronic filter, the first current signal and the second current signal.

In one example system, the first current sensing device can be a hall effect sensor.

In one example system, the first generator comprises a wound field synchronous generator.

Also disclosed is a method of operating a power supply system. The system can be any system mentioned above in any combination thereof.

In one embodiment, the method includes: providing a first direct current (DC) power supply comprising a first generator and a first rectifier circuit; providing a second DC power supply comprising a second generator and a second rectifier, wherein a first output of the first DC power supply and a second output of the second DC power supply are commonly coupled at a common bus point; providing a first current sensing device coupled between the first output of the first DC power supply and the common bus point; providing a second current sensing device coupled between the second output of the second DC power supply and the common bus point; receiving a first current signal from the first current sensing device and a second current signal from the second current sensing device; analyzing the first current signal and the second current signal to determine a first voltage foldback value based on a first common mode current calculated from the first current signal and the second current signal; and operating the first DC power supply to reduce a first voltage output of the first DC power supply by the first voltage foldback value.

In one example method, the first DC power supply can be in parallel with the second DC power supply.

In one example method, the first voltage foldback value can be based off of a first common mode current portion ($i_{CM}$) of the first current signal.

In one example method, $i_{CM}=(i_1+i_2)*0.5$ wherein $i_1$ is the first current signal and $i_2$ is the second current signal.

In one example method, the method can further include: providing a second generator controller; receiving at the second generator controller the first current signal and the second current signal; analyzing with the second generator controller the first current signal and the second current signal to determine a second voltage foldback value based on a second common mode current calculated from the first current signal and the second current signal; and operating the second DC power supply to reduce a first voltage output of the second DC power supply by the second voltage foldback value.

In one example method, second voltage foldback value can based off of a second common mode current portion ($i_{CM2}$) of the second current signal. In any prior method, $i_{CM2}=(i_1+i_2)*0.5$.

In one example method, determining the first voltage foldback value comprises: filtering, by an electronic filter, the first current signal and the second current signal.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification.

The foregoing and other features and advantages of the embodiments of the invention are apparent from the following detailed description taken in conjunction with the accompanying drawings in which.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

For the sake of brevity, conventional techniques related to making and using aspects of the invention may or may not be described in detail herein. In particular, various aspects of aircraft electric power systems to implement the various technical features described herein are well known. Accordingly, in the interest of brevity, many conventional implementation details are only mentioned briefly herein or are omitted entirely without providing the well-known system and/or process details.

Figure 1:
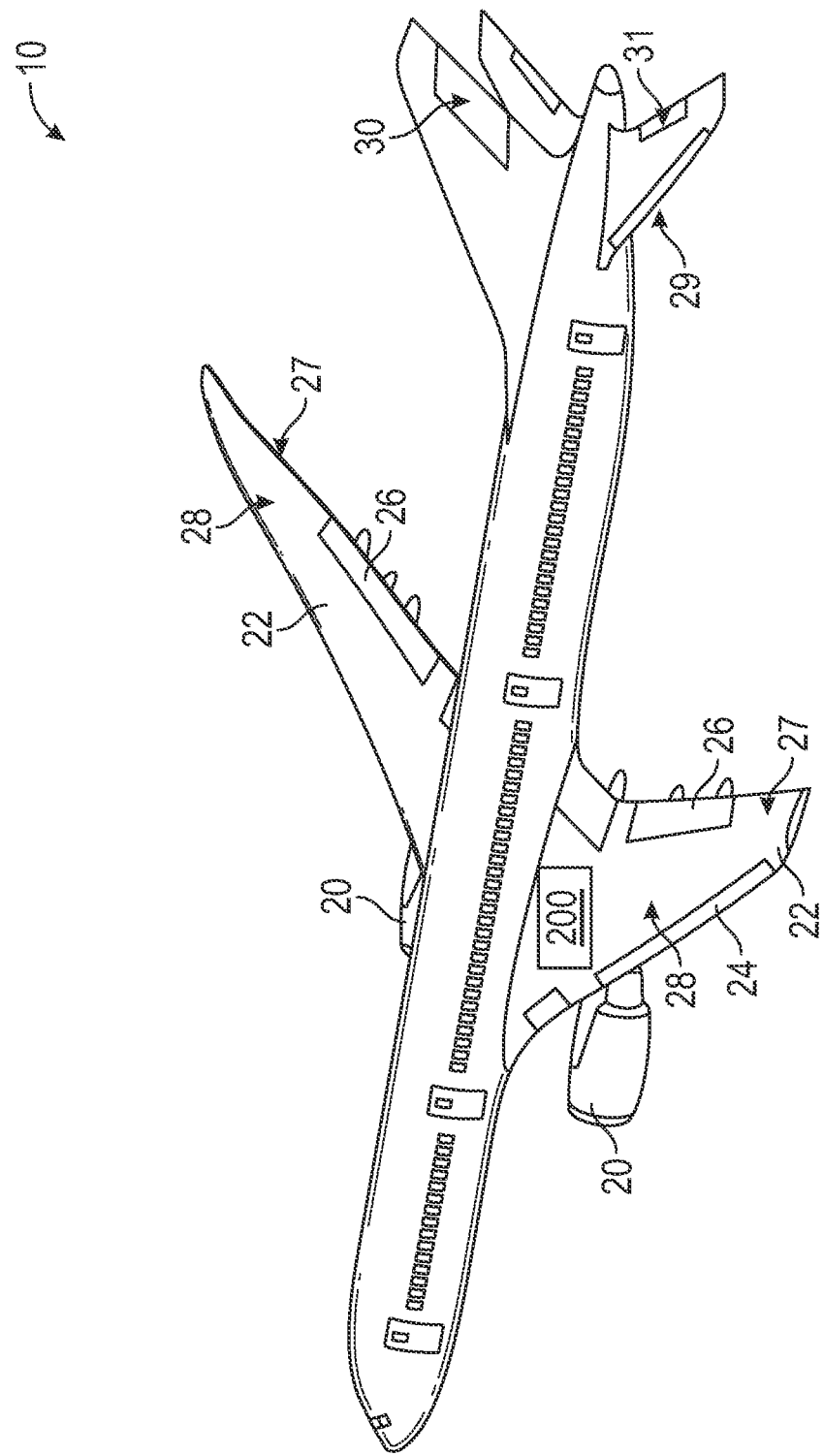
FIG. 1 is a perspective view of an aircraft that may incorporate embodiments of the present disclosure.

FIG. 1 illustrates an example of a commercial aircraft 10 having aircraft engines 20 that may embody aspects of the teachings of this disclosure. The aircraft 10 includes two wings 22 that each include one or more slats 24 and one or more flaps 26. The aircraft further includes ailerons 27, spoilers 28, horizontal stabilizer trim tabs 29, rudder 30 and horizontal stabilizer 31. The term "control surface" used herein includes but is not limited to either a slat or a flap or any of the above described. It will be understood that the slats 24 and/or the flaps 26 can include one or more slat/flap panels that move together. The aircraft 10 also includes a system 200 (described in greater detail in FIG. 2) which allows for passive power sharing for parallel sources according to one or more embodiments. The parallel sources can supply power to a DC bus that provides power for a variety of power applications on the aircraft.

Turning now to an overview of technologies that are more specifically relevant to aspects of the disclosure, when the aircraft is in the air the power comes from an electric power generating system (EPGS) which typically includes one or more generators. An example generator includes, but is not limited to, permanent magnet generators (PMG) that include permanent magnets mounted on a rotating shaft driven by a prime mover such as the turbine engine on the aircraft. The power generator from these generators can be rectified to provide a DC power supply to power a DC bus on the aircraft. In some instances, it may be desirable to have two (or more) DC power supplies operating in parallel to provide DC power to the DC bus. This allows for the DC power bus to provide more power for large loads such as an electrical propulsion system.

Using parallel DC power supplies provide flexibility when there is a demand for a high load current that is more than a single DC power supply can provide. Advantages of the parallel supplies versus using a larger DC power supply includes the ability for independent channel operation, installation flexibility & the load management configuration.

However, two or more DC power supplies connected in parallel do not automatically share a load equally. Even if the power supplies are identical, the output voltages will be slightly different due to component tolerances and a variety of other factors. The power supply with the higher voltage output will typically provide the entire load current, operating at its limit while the other power supply essentially does very little work. This scenario is not optimal because it essentially overloads a power supply which could cause the power supply to fail at a faster rate.

In one or more embodiments, aspects described herein address power sharing amongst parallel DC power supplies.

Figure 2:
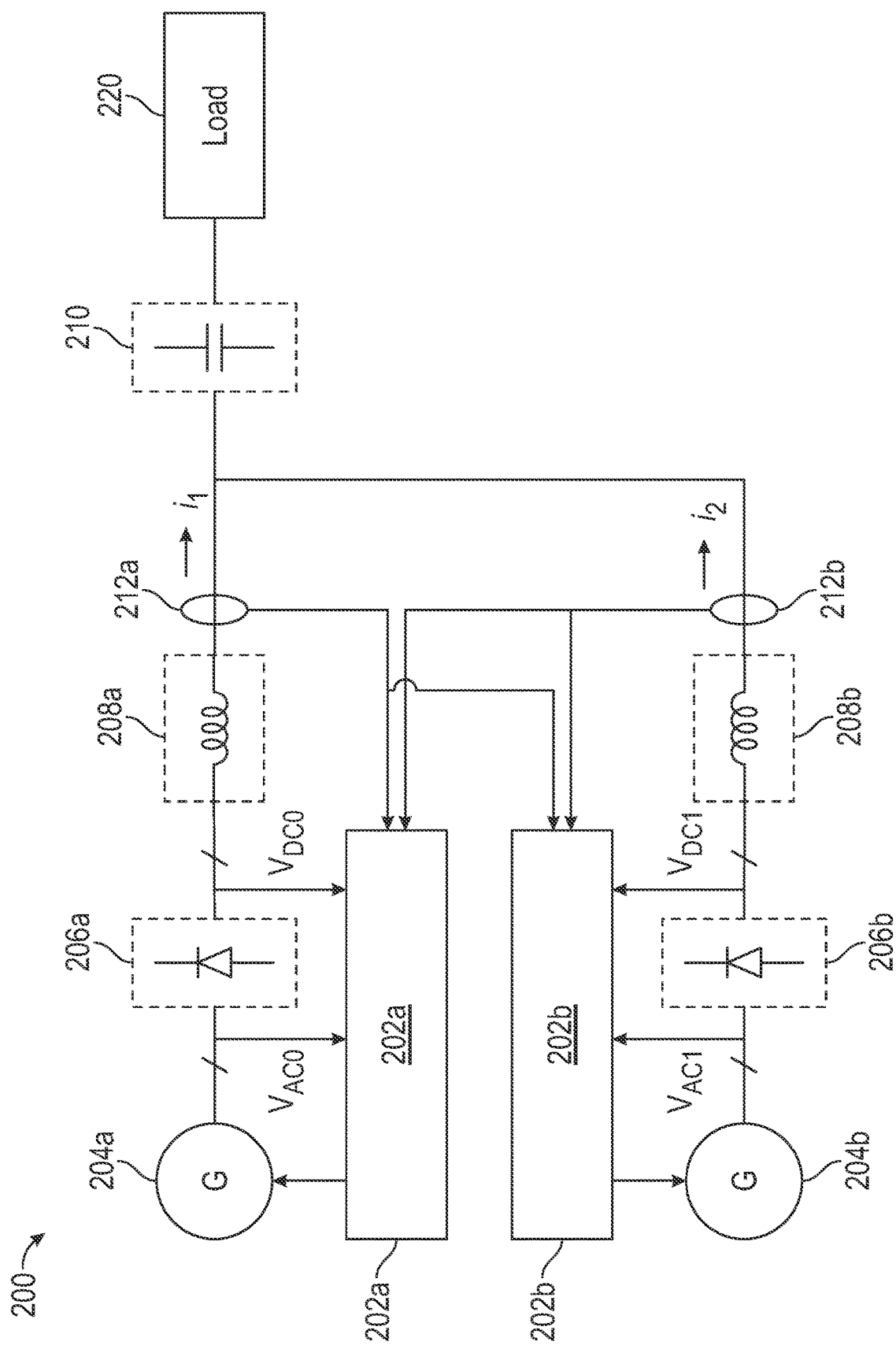
FIG. 2 depicts a block diagram of a passive power sharing system with two parallel sources according to one or more embodiments.

FIG. 2 depicts a block diagram of a power sharing system with two parallel sources according to one or more embodiments. The system 200 includes two generators 204a, 204b. In one or more embodiments, the generators 204 can be a permanent magnet generator (PMG) on an aircraft as discussed above. The system 200 also includes a two rectifiers 206a, 206b which can be any type of rectifier circuit including both active and passive rectifiers.

The system 200 can optionally includes an impedance 208a, 208b to capture parasitic impedance of the feeders. In general, the bus includes feeder impedances (e.g. resistance and inductance between the generator and rectifier, as part of the rectifier/filter circuit, between the rectifier and point of common coupling (PCC), and between the PCC and the load. As shown in the system 200, the DC bus is commonly coupled to provide DC power to the load 220 at a point of common coupling. The DC bus can have a filter 210 attached prior to the commonly coupled DC bus providing power to the load 220. In some embodiments, the filter 210 can be positioned before the point of common coupling of the DC bus, for example two filters could be directly after the two rectifiers 206a, 206b. The filter 210 can be any type of electronic filter.

In one or more embodiments, the generators 204a, 204b are controlled and operated by a generator controller 202a, 202b. Further, the generator controllers 202a, 202b are configured to receive current readings and/or signals from a current sensing device 212a, 212b before the point of common coupling of the sources. The current sensing devices 212a, 212b can be any type of device operable to sense current values from a bus such as, for example, a hall effect sensor or a current sense resistor.

In one or more embodiments, the generator controllers 202a, 202b are configured to reduce or "foldback" the voltage output of the generators 204a, 204b in the system 200 responsive to sensing a feedback current measured from the current sensing devices 212a, 212b. As shown in FIG. 2, the sensing devices 212a, 212b, respectively, measure currents $i_1$ and $i_2$. As used herein, the foldback for electrical systems is typically to limit power draw of the generator from the APU/engine and/or to limit the current that the generator supplies to the system in the event of a system fault in order to protect the system wiring. For example, for normal operation (up to 1.5 rated current) in order to provide load sharing between channels differential mode current is used for control. The foldback discussed herein is for situations that are above such conditions.

In prior art systems, generator controllers performed the foldback of the voltage for their respective generator independent of the current value measured for the other generator and independent of the current of the entire system load.

The systems herein, however, take advantage of information from both currents during foldback and more fully set forth below. In particular, it is noted that the current measured by each current sensor 212 includes both a common mode and a differential mode components.

In operation, generator 204a produces an AC voltage that is rectified by the rectifier circuit 206a to produce a DV voltage to the DC bus. Prior to the point of the common coupling of the DC bus, the DC current is measured by current sensing device 212a and provided to the generator controller 202a. The generator controller 202a analyzes this DC current and provides a command to foldback the voltage of the generator 204a based on this DC current value. In one or more embodiments, the command to foldback the voltage of a generator 204a, 204b can be calculated, for example, as a function of the DC current value.

In more detail, herein, the command to foldback the voltage of a generator 204a, 204b can be calculated, for example, as a function of the common mode DC current value. In is noted that the inventors herein have recognized that two channel parallel system the two DC channel currents can be separated into common and differential mode components.

Each channel current, (e.g. $i_1$ and $i_2$) consists of both common mode ($i_{CM}$) and differential mode components ($i_{DM}$). Take for example, $i_1$. It is known that:

$$i_1 = i_{CM} + i_{DM}. \qquad (1)$$

The inventors hereof have discovered that when in foldback the common mode component drives the DC voltage down and in so doing completes the current feedback loop. However, the differential current component has no effect on the DC voltage and so sees a very different, much higher gain, feedback transmission. A greater change in current occurs because the voltage is not 'free to move'. This very high gain DM path forces a compromise to be made when designing the foldback controller. Such a compromise can include adding additional low-pass filtering to maintain stability with reduced performance. To address this, the generator controllers 202a, 202b will each compute the CM current and use that for scheduling the voltage foldback.

This can be achieved because the inventors hereof have recognized that:

$$i_{CM} = (i_1 + i_2)*0.5; \text{ and} \qquad (2)$$

$$i_{DM} = (i_1 - i_2)*0.5. \qquad (3)$$

Thus, as shown, each generator controllers 202a, 202b will receive measurements of both $i_1$ and $i_2$. From that, the generator controllers 202a, 202b will compute $i_{CM}$ from equation 2 above. Using a control algorithm, a new desired $i_1$ can then be computed by using $i_{CM}$ as opposed to $i_1$ as in the prior art. The same can be done for $i_2$.

Figure 3:
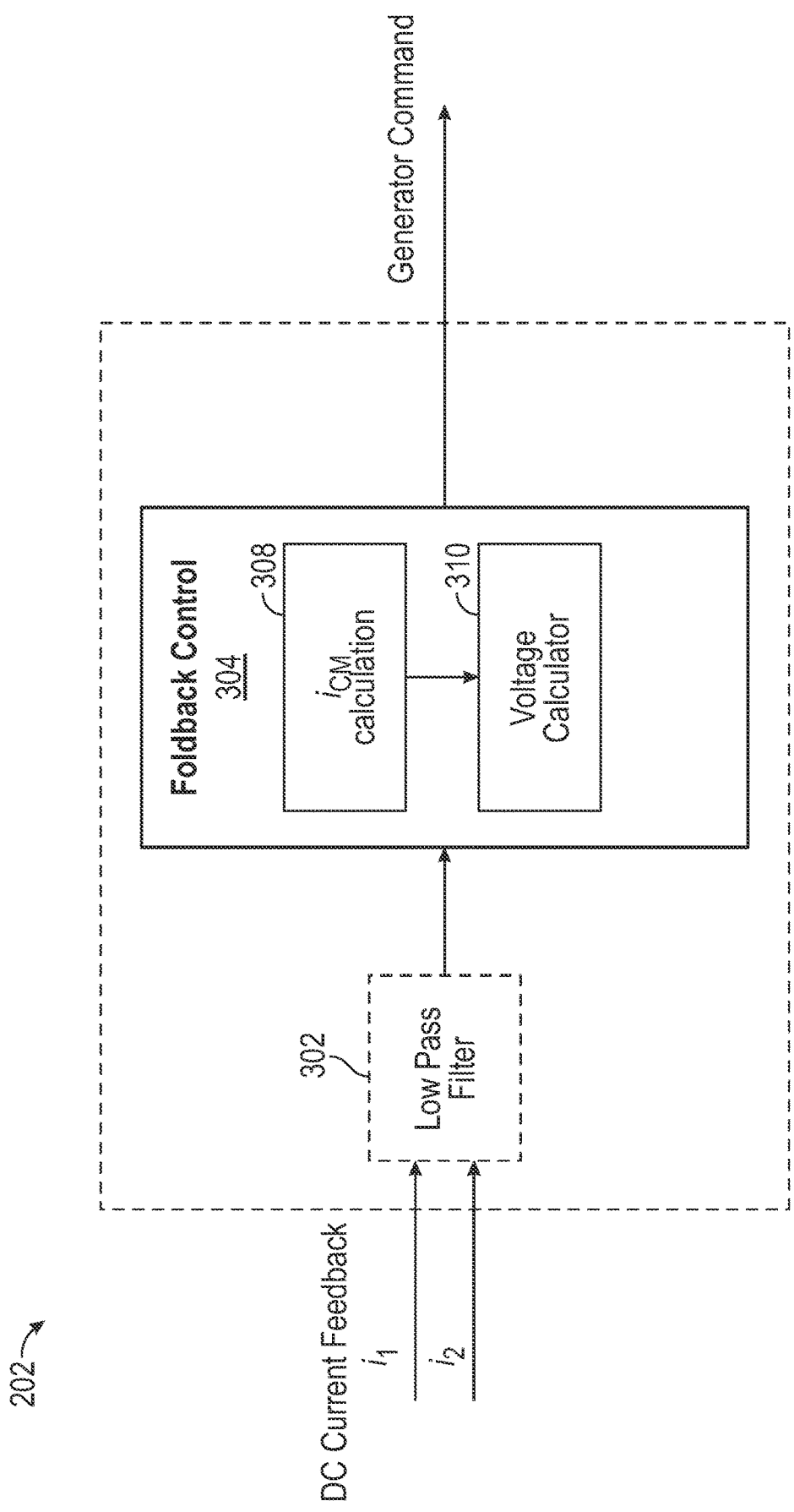
FIG. 3 depicts a block diagram of a generator controller performing droop control for a generator according to one or more embodiments.

FIG. 3 depicts a block diagram of a generator controller 202 performing foldback control for a generator according to one or more embodiments. The controller 202 receives the DC current feedback from the current sensing devices 212a/212b in the form of currents $i_1$ and $i_2$. Optionally, these currents can be passed through a low pass filter 302. The low pass filter 302 can be any type of low pass filter circuit design. The low pass filter 302 filters out noise that may be present in the DC current feedback signals $i_1$ and $i_2$ received from the current sensing device 212.

In one or more embodiments, the foldback control 304 module can calculate the voltage foldback by first determining the desired $i_{CM}$ as discussed above. This can be performed by $i_{CM}$ current calculation block 308.

Then a voltage calculator 310 can be employed to command the generator to output a particular voltage based on the measured calculated $i_{CM}$.

Any type of function calculation can be utilized for feedback control including any linear or non-linear function using the calculated $i_{CM}$. In one or more embodiments, a lookup table 310 can be utilized for calculating the voltage droop value by the droop control 304 module. The lookup table 310 can include stored voltage droop values with corresponding current feedback values. The drop control 304 module can determine the current feedback value and select the voltage droop value based on these values in the lookup table 310.

The generator controller 202 can operate the generator 204 (from FIG. 2) to reduce its output voltage by the calculated foldback voltage value. For example, in a wound field synchronous machine, the generator controller would adjust the field current in order lower the output voltage. In the case of a PMG, a power converter can be included to lower the DC link voltage (e.g. an active rectifier). Another example for adjusting PMG output voltage includes adjusting the speed of the generator, if available as an option in the generator configuration. In one or more embodiments, the generator controllers 202a, 202b can receive DC current values from the current sensing devices 212a, 212b at a defined sampling rate. An exemplary sampling rate could be between 50-100 μs. Any sampling rate can be utilized herein.

In one or more embodiments, the generator controller 202a, 202b or any of the hardware referenced in the system 200 can be implemented by executable instructions and/or circuitry such as a processing circuit and memory. The processing circuit can be embodied in any type of central processing unit (CPU), including a microprocessor, a digital signal processor (DSP), a microcontroller, an application specific integrated circuit (ASIC), a field programmable gate array (FPGA), or the like. Also, in embodiments, the memory may include random access memory (RAM), read only memory (ROM), or other electronic, optical, magnetic, or any other computer readable medium onto which is stored data and algorithms as executable instructions in a non-transitory form.

Figure 4:
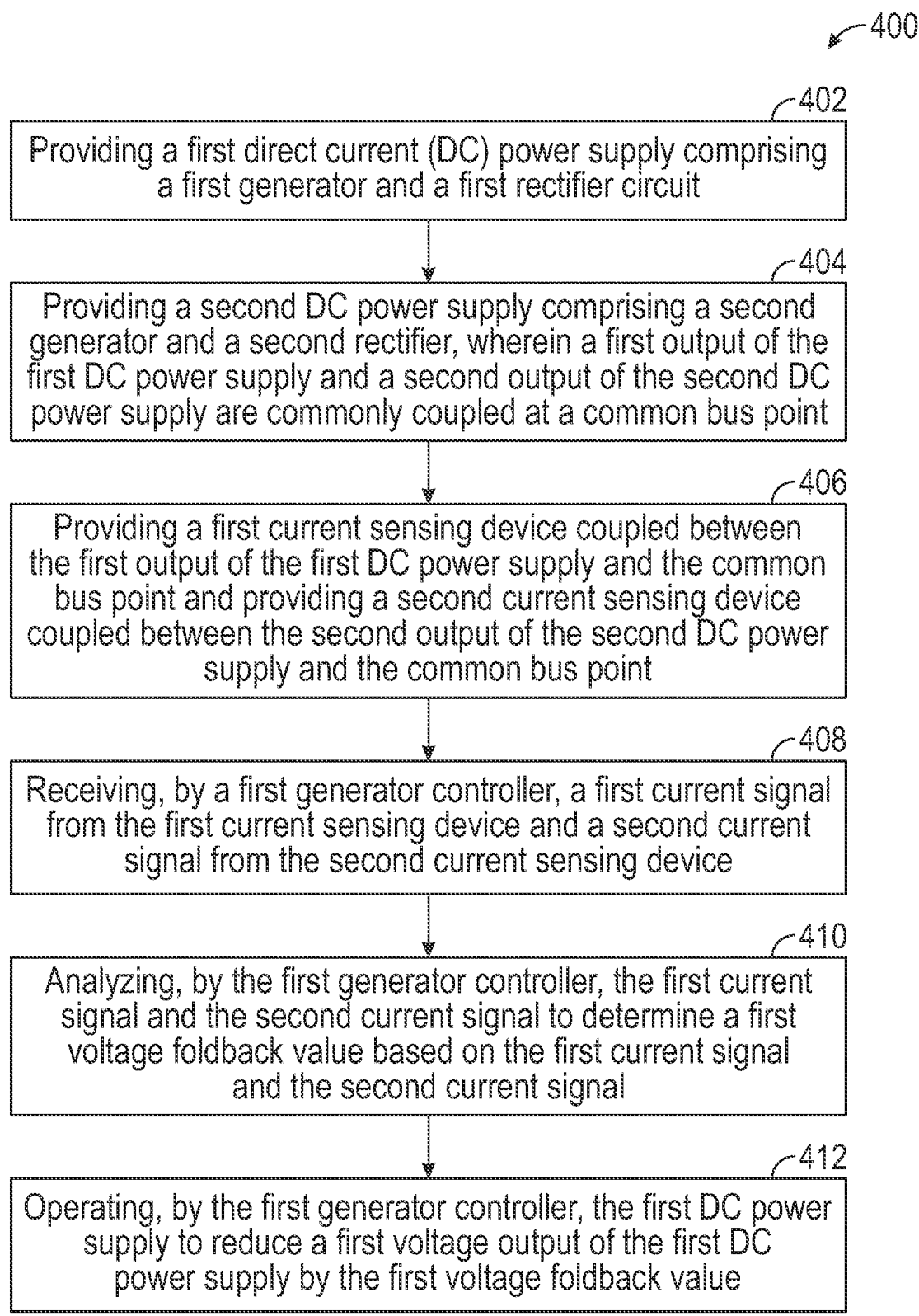
FIG. 4 depicts a flow diagram of a method for passive power sharing of parallel sources according to one or more embodiments.

FIG. 4 depicts a flow diagram of a method for passive power sharing of parallel sources according to one or more embodiments. The method 400 includes providing a first direct current (DC) power supply comprising a first generator and a first rectifier circuit, as shown in block 402. At block 404, the method 400 includes providing a second DC power supply comprising a second generator and a second rectifier, wherein a first output of the first DC power supply and a second output of the second DC power supply are commonly coupled at a common bus point. The first DC power supply and the second DC power supply can be arranged as parallel power supplies to provide high voltage DC current to a DC bus on an aircraft for various applications. The method 400 also includes providing a first current sensing device coupled between the first output of the first DC power supply and the common bus point and providing a second current sensing device coupled between the second output of the second DC power supply and the common bus point, as shown in block 406. At block 408, the method 400 includes receiving, by the first generator controller, a first current signal from the first current sensing device and a second current signal from a second current sensing device. The method 400 then includes analyzing, by the first generator controller, the first current signal to determine a first voltage foldback value based on the first current signal and the second current signal, as shown in block 410. This voltage foldback is based off of the common mode voltage as discussed above. And at block 412, the method 400 includes operating, by the first generator controller, the first DC power supply to reduce a first voltage output of the first DC power supply by the first voltage foldback value. These same operations can be performed by the second generator controller.

Additional processes may also be included. It should be understood that the processes depicted in FIG. 4 represent illustrations, and that other processes may be added or existing processes may be removed, modified, or rearranged without departing from the scope and spirit of the present disclosure.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A power supply system comprising:
a first direct current (DC) power supply comprising a first generator and a first rectifier circuit;
a second DC power supply comprising a second generator and a second rectifier, wherein a first output of the first DC power supply and a second output of the second DC power supply are commonly coupled at a common bus point;
a first current sensing device coupled between the first output of the first DC power supply and the common bus point;
a second current sensing device coupled between the second output of the second DC power supply and the common bus point;
a first generator controller configured to:
receive a first current signal from the first current sensing device and a second current signal from the second current sensing device;

analyze the first current signal and the second current signal to determine a first voltage foldback value based on a first common mode current calculated from the first current signal and the second current signal; and operate the first DC power supply to reduce a first voltage output of the first DC power supply by the first voltage foldback value.

2. The system of claim 1, wherein the first DC power supply is in parallel with the second DC power supply.

3. The system of claim 1, wherein the first voltage foldback value is based off of a first common mode current portion ($i_{CM}$) of the first current signal.

4. The system of claim 3, wherein: $i_{CM}=(i_1+i_2)*0.5$ wherein $i_1$ is the first current signal and $i_2$ is the second current signal.

5. The system of claim 4, further comprising:
a second generator controller configured to:
receive the first current signal and the second current signal;
analyze the first current signal and the second current signal to determine a second voltage foldback value based on a second common mode current calculated from the first current signal and the second current signal; and
operate the second DC power supply to reduce a second voltage output of the second DC power supply by the second voltage foldback value.

6. The system of claim 5, wherein the second voltage foldback value is based off of a second common mode current portion ($i_{CM2}$) of the second current signal.

7. The system of claim 6, wherein: $i_{CM2}=(i_1+i_2)*0.5$.

8. The system of claim 1, wherein determining the first voltage foldback value comprises:
filtering, by an electronic filter, the first current signal and the second current signal.

9. The system of claim 1, wherein the first current sensing device comprises a hall effect sensor.

10. The system of claim 1, wherein the first generator comprises a wound field synchronous generator.

11. A method of operating a power supply system that includes: a first direct current (DC) power supply comprising a first generator and a first rectifier circuit; a second DC power supply comprising a second generator and a second rectifier, wherein a first output of the first DC power supply and a second output of the second DC power supply are commonly coupled at a common bus point; a first current sensing device coupled between the first output of the first DC power supply and the common bus point; a second current sensing device coupled between the second output of the second DC power supply and the common bus point, and a controller, wherein the method comprises:
receiving, at the controller, a first current signal from the first current sensing device and a second current signal from the second current sensing device;
analyzing, at the controller, the first current signal and the second current signal to determine a first voltage foldback value based on a first common mode current calculated from the first current signal and the second current signal; and
operating the first DC power supply to reduce a first voltage output of the first DC power supply by the first voltage foldback value.

12. The method of claim 11, wherein the first DC power supply is in parallel with the second DC power supply.

13. The method of claim 11, wherein the first voltage foldback value is based off of a first common mode current portion ($i_{CM}$) of the first current signal.

14. The method of claim 13, wherein: $i_{CM}=(i_1+i_2)*0.5$ wherein $i_1$ is the first current signal and $i_2$ is the second current signal.

15. The method of claim 14, wherein the power supply system further includes a second generator controller, wherein the method further includes:
receiving at the second generator controller the first current signal and the second current signal;
analyzing with the second generator controller the first current signal and the second current signal to determine a second voltage foldback value based on a second common mode current calculated from the first current signal and the second current signal; and
operating the second DC power supply to reduce a first voltage output of the second DC power supply by the second voltage foldback value.

16. The method of claim 15, wherein the second voltage foldback value is based off of a second common mode current portion ($i_{CM2}$) of the second current signal.

17. The method of claim 16, wherein: $i_{CM2}=(i_1+i_2)*0.5$.

18. The method of claim 11, wherein determining the first voltage foldback value comprises:
filtering, by an electronic filter, the first current signal and the second current signal.

* * * * *